United States Patent [19]

Steckler

[11] 4,426,492

[45] Jan. 17, 1984

[54] DISPOSABLE, HYDROGEL SOFT CONTACT LENSES

[75] Inventor: Robert Steckler, Mission Viejo, Calif.

[73] Assignee: Plastomedical Sciences, Inc., Briarcliff Manor, N.Y.

[21] Appl. No.: 298,865

[22] Filed: Sep. 3, 1981

[51] Int. Cl.$^3$ .............................................. C08L 29/04
[52] U.S. Cl. ........................................ 525/61; 525/58; 525/937; 523/106
[58] Field of Search ............... 525/56, 58, 61, 937; 523/106

[56] References Cited

U.S. PATENT DOCUMENTS

| | | | |
|---|---|---|---|
| 2,796,413 | 7/1957 | Baer | 525/56 |
| 3,220,960 | 11/1965 | Wichterle et al. | |
| 3,334,057 | 8/1967 | Marks et al. | 260/23 |
| 3,503,942 | 3/1970 | Seiderman | 260/80.75 |
| 3,532,679 | 10/1970 | Steckler | 260/80.72 |
| 3,937,680 | 2/1976 | de Carle | |
| 4,251,643 | 2/1981 | Harada et al. | 525/61 |

FOREIGN PATENT DOCUMENTS

| | | | |
|---|---|---|---|
| 50-45087 | 4/1975 | Japan | 525/61 |
| 54-20093 | 2/1979 | Japan | 525/61 |
| 54-43496 | 4/1979 | Japan | 525/61 |
| 54-143496 | 11/1979 | Japan | 525/61 |
| 55-12173 | 1/1980 | Japan | 525/61 |
| 1145961 | 3/1969 | United Kingdom | 525/61 |

OTHER PUBLICATIONS

Schildknecht, C. E., *Vinyl and Related Polymers,* Wiley (1952), pp. 343, 350 & 351.
Merck Index, 7th Ed., Merck & Co. (1960), p. 834.
Minsk, Priest & Kenyon, "The Alcoholysis of Polyvinyl Acetate", *Journal Am. Chem. Soc.,* vol. 63 (1941), pp. 2715-2721.
P. Robinson, Design of Water Reducible Polymers for Use in Food Contact Applications, J. of Coatings Technology, vol. 53, No. 674, Mar. 1981, pp. 23-30.

*Primary Examiner*—Wilbert J. Briggs, Sr.
*Assistant Examiner*—Robert E. L. Sellers
*Attorney, Agent, or Firm*—George L. Tone

[57] ABSTRACT

Stable three dimensional hydrogels which absorb water, but are insoluble in water, and are particularly useful for the making of soft contact lenses, are prepared by reacting a water insoluble polyvinyl resin which contains reactive hydroxyl groups in its polymer chain, with a di- or poly-basic acid anhydride, to thereby introduce pendant carboxyl groups into the polymer chain, followed by treatment of the thus obtained carboxylated polymer to effect a limited amount of crosslinking thereof whereby a sparingly crosslinked hydrophilic polymer is obtained which when immersed in water absorbs water and swells to form a hydrogel, which does not dissolve in water.

12 Claims, No Drawings

DISPOSABLE, HYDROGEL SOFT CONTACT LENSES

This invention relates to sparingly crosslinked hydrophilic polymers having a stable three dimensioned polymer net-work, which swell when immersed in water, but will not dissolve in water, and which hereafter are referred to as "Hydrogels." Such Hydrogels have found widespread commercial applications in such areas as controlled release pharmaceuticals, herbicides, insecticides, etc.; in industrial applications such as battery separators; and especially in "Softlenses," soft contact lenses for the correction of vision, or the treatment of eye diseases.

Presently available soft contact lenses are relatively fragile and subject to damage. They scratch easily. Their tear resistance is low, and there is a danger of damaging or tearing the lenses when inserting or removing them from the eye. They must be sterilized frequently and regularly (preferrably daily) to remove bacteria deposits. The eventually tend to become cloudy to varying degrees, due to protein deposits; this can greatly affect clarity and vision. Ideally, Softlenses should be discarded after a few months of use, before evidence of deterioration becomes readily noticeable. Unfortunately, their high cost, e.g. $150.00 or more for a pair, discourages the user from discarding the lenses, until deterioration has become rather far advanced. This can lead to eye injury or damage, including serious eye diseases, due to bacteria, protein deposits, impurities, etc.

THE PRIOR ART

Conventional Softlenses are based on HEMA (Hydroxyethyl methacrylate)/polymers, e.g. U.S. Pat. No. 3,503,942 of Mar. 31, 1970 to M. Seiderman, or HEMA-Vinyl Pyrrolidone copolymers, e.g. my U.S. Pat. No. 3,532,679 of Oct. 6, 1979 to R. Steckler;/or similar hydrophilic polymeric compositions, polymerized under closely controlled conditions to form rods or pellets from which lenses are ground and polished to optical specifications. In the case of monomer blends which can be cast in molds, semi-finished or completed lens shapes can be obtained. All these processes are slow, tedious and account for the high cost of Softlenses.

The modification of hydroxyl containing polymers, by reaction thereof with polybasic acids or their anhydrides, in order to introduce pendant or terminal carboxyl groups into the polymer chain, has been studied extensively, in order to produce self emulsifying or water dispersible polymers, primarily epoxy based polymers, which could be applied as an aqueous solution or dispersion, which was free of organic solvents, as coatings and adhesives which become water resistant during subsequent cure; see for example the review article by Peter V. Robinson entitled; "Design of Water Reducible Polymers for Use in Food Contact Applications" appearing in The Journal of Coatings Technology, Vol. 53, No. 674, March 1981, pages 23-30. Such products, however, are not Hydrogels, since they lack the sparingly crosslinked structure, which is characteristic of Hydrogels, and they are hydrophobic or water resistant rather than hydrophillic. Also, of particular interest so far as the present application is concerned, is U.S. Pat. No. 3,334,057 of Aug. 1, 1967 to B. S. Marks and R. S. Sedgwick (Continental Can. Co.). This patent discloses a vinyl polymer containing free hydroxyl groups, i.e. a vinyl copolymer containing 91% vinyl chloride, 3% vinyl acetate and 6% vinyl alcohol carboxylated by reaction with trimellitic anhydride to yield a carboxylated adducts containing 0.5-6% of bound mono-ester of trimellitic acid. 100 parts of this carboxylated adduct was then formulated as a solution in 400 parts of methyl ethyl ketone with 20-50 parts by weight (usually 40 parts) of epoxidized (e.g., oxirane content, 6.4% oxygen) soybean oil. This solution was then applied as an adhesive strip along the sides of metal can making blanks, dried to remove the solvent (MEK), and the blanks then formed into both lap seam and hook or locked seam containers with the dried polymer strips as an adhesive and seal layer between the overlapping portions of the metal sheet at the seam, and the polymer layer then cured by heat to convert it into a thermoset resin. In one example, Example IX, the 91% vinyl chloride, 3% vinyl acetate, 6% vinyl alcohol terpolymer was replaced by a polyvinyl butyral resin, with 9-13% unreacted vinyl alcoholsites (Monsanto, BUTVAR B-76 polyvinyl butyral resin) which was carboxylated by reaction with trimellitic anhydride to give a carboxylated adduct having 3.7% of bound anhydride; this was tested in a similar manner as a seam adhesive and seal for metal cans. As discussed, at Col. 3, line 4 et seq., in U.S. Pat. No. 3,334,657, when the carboxylated adduct of that patent "is employed with an epoxy compound having two or more epoxy groups on the molecule, e.g. epoxidized linseed or soybean oil" crosslinking can occur on curing; however the amount of such epoxy compounds, 20-50 parts by weight thereof, for each 100 parts by weight of carboxylated adduct, is such that the final cured products of this patent are crosslinked to an extent beyond the "low degree of crosslinking" which is characteristic of Hydrogels; instead they are thermoset, hydrophobic resins which are quite resistant to water and will not absorb water to form a Hydrogel.

SUMMARY OF THE INVENTION

I have now found certain hydrophilic polymeric compositions which can be simultaneously molded and crosslinked by "reaction molding" process to form final shaped, sparingly crosslinked hydrophilic polymer structures characteristic of Hydrogels, and which form swelled Hydrogels when immersed in water. Thus, Softlenses can be produced inexpensively, as several thousand lenses can be molded from a single pound of polymer. Thus, it becomes economically feasible to discard these lenses at regular intervals, prior to jeopardy of eye injury, damage or disease from contaminated lenses, which have been retained beyond their safe useful life for strictly economic reasons.

In brief summary, I have now found that if certain water-insoluble polyvinyl resins containing reactive hydroxyl groups in their polymer chain are first carboxylated by reaction of hydroxyl groups of the vinyl polymer with dibasic or polybasic acid anhydrides, to form the half ester with the polymer and thereby introduce pendent carboxy groups into the polymer; and the thus obtained carboxylated polymer is then sparingly crosslinked (in the manner more fully described below) there is thus obtained a sparingly crosslinked hydrophilic polymer, which when immersed in water, absorbs water and swells (but does not dissolve in water) to form a Hydrogel.

The novel Hydrogels of the present invention, are characterized by superior physical properties as compared to the HEMA and HEMA-Vinyl Pyrrolidone copolymer based Hydrogels presently used in Softlenses. Such improvement is especially noticeable in tensile strength, elongation and tear resistance; and is of importance not only to Softlenses, but to essentially all other Hydrogel applications. Consequently while emphasizing Hydrogels useful in Softlenses, which is currently the most important commercial application of my novel Hydrogels, I do not exclude the use of my novel Hydrogels in other Hydrogel applications, including pharmaceuticals, implants, cosmetic surgery, and such industrial applications as battery separators.

DETAILED DESCRIPTION OF THE INVENTION a. Starting Materials

The hydroxyl containing vinyl polymers useful as starting materials for the production of the novel hydrogels of this invention are water insoluble Polyvinyl Acetals and water insoluble partially hydrolyzed Polyvinyl Acetate. Both of these types of polymers are obtained from polyvinyl acetate by partial hydrolysis thereof.

The partially hydrolized polyvinyl acetate resins useful as the starting material for the products of this invention, are those water insoluble partially hydrolyzed polyvinyl acetate polymers in which only a minor portion of the vinyl acetate groups have been hydrolized to vinyl alcohol groups, so that the chemical composition of the resulting vinyl alcohol-vinyl acetate copolymer in % by weight is from about 92.5% to about 53% vinyl acetate groups and from about 7.5% to about 47% vinyl alcohol groups. Commercially available partially hydrolized vinyl acetate resins of this type which may be used are available from Union Carbide Corporation, New York, N.Y. as:

"BAKELITE Vinyl Alcohol-Vinyl Acetate Resin Solutions"

| | Approximate Chemical Composition % by Weight | |
|---|---|---|
| No. | Vinyl Acetate | Vinyl Alcohol |
| T-24-9 | 91 | 9 |
| MA-28-18 | 82 | 18 |
| BA-28-18 | 72 | 18 |

Polyvinyl Acetal resins, as is well known in the art, are produced by reaction of an aldehyde with a polyvinyl alcohol (obtained by hydrolysis of polyvinyl acetate). For this use the polyvinyl alcohols are usually classified as "partially hydrolized" (15–30% polyvinyl acetate groups) and "completely hydrolized" (0–5% polyvinyl acetate groups). Both types, in various molecular weight grades, are used in producing commercial polyvinyl acetals. The conditions of the acetal reaction and the concentration of the particular aldehyde and polyvinyl alcohol used are closely controlled to obtain polymers containing predetermined proportions of hydroxyl groups, acetate groups and acetal groups. The final product (Polyvinyl acetal) may be represented by the following stylized structure:

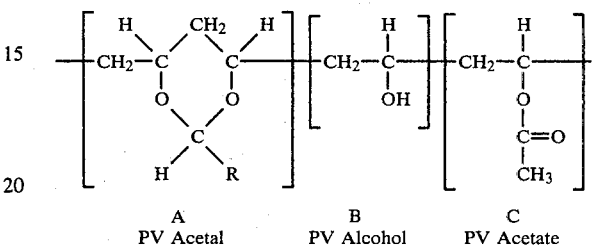

A — PV Acetal  B — PV Alcohol  C — PV Acetate

As stated, the proportions of A, B and C are controlled and they are randomly distributed along the molecule.

As examples of commercially available polyvinyl acetals which may be used as starting materials in the present invention may be mentioned:

FORMVAR polyvinyl formal (Monsanto Co., St. Louis, Mo.),

ALVAR polyvinyl acetal (Monsanto Co., St. Louis, Mo.),

BUTVAR polyvinyl butyral (Monsanto Co., St. Louis, Mo.),

BAKELITE vinyl butyral (Union Carbide Corp., New York, N.Y.).

BAKELITE vinyl butyral resin XYHL & BAKELITE vinyl butyral resin XYSG are both described by the manufacturer as having the approximate chemical composition by weight of 1% vinyl acetate, 20% vinyl alcohol and (by difference) 79% vinyl butyral; the XYHL is described as having an approximate typical Inherent Viscosity of 0.90 (ASTM D 1243, Proc. A) while the XYSG has an Inherent Viscosity of 1.23.

The physical properties of the BUTVAR Polyvinyl Butyral Resins, as published by the manufacturer Monsanto Co.) are shown in Table 1 below; while those for the FORMVAR Polyvinyl Formal Resins are shown in Table 2.

TABLE 1

| | | | BUTVAR Polyvinyl Butyral Resins | | | | | | |
|---|---|---|---|---|---|---|---|---|---|
| Property | Units | ASTM Method | B-72 | B-74 | B-73 | B-76 | B-79 | B-90 | B-98 |
| PHYSICAL | | | | | | | | | |
| Form | | | white, free-flowing powder | | | | | | |
| Volatiles, max. | % | | 3.0 | 3.0 | 3.0 | 5.0 | 5.0 | 5.0 | 5.0 |
| Molecular wt. (weight average) | — | (1) | 180,000–270,000 | 100,000–150,000 | 50,000–80,000 | 45,000–55,000 | 34,000–38,000 | 38,000–45,000 | 30,000–34,000 |
| Solution viscosity 15% by wt. | cp. | (2) | 8,000–18,000 | 4,000–8,000 | 1,000–4,000 | 500–1,000 | 100–200 | 600–1,200 | 200–450 |
| Solution viscosity 10% by wt. | cp. | (2) | ca. 1,570 | ca. 700 | ca. 400 | ca. 175 | ca. 55 | ca. 195 | ca. 75 |
| Specific gravity 23°/23° (±0.002) | — | D792-50 | 1.100 | 1.100 | 1.100 | 1.083 | 1.083 | 1.100 | 1.100 |
| Burning rate | ipm | D635-56T | 1.0 | 1.0 | 1.0 | 1.0 | 1.0 | 0.9 | 0.8 |
| Refractive index (±0.0005) | — | D542-50 | 1.490 | 1.490 | 1.490 | 1.485 | 1.485 | 1.490 | 1.490 |
| Water absorption (24 hours) | % | D570-59aT | 0.5 | 0.5 | 0.5 | 0.3 | 0.3 | 0.5 | 0.5 |

TABLE 1-continued

BUTVAR Polyvinyl Butyral Resins

| Property | Units | ASTM Method | B-72 | B-74 | B-73 | B-76 | B-79 | B-90 | B-98 |
|---|---|---|---|---|---|---|---|---|---|
| Hydroxyl content expressed as % polyvinyl alcohol | — | D1396-58+ | 17.5–21.0 | 17.5–21.0 | 17.5–21.0 | 9.0–13.0 | 9.0–13.0 | 18.0–20.0 | 18.0–20.0 |
| Acetate content expressed as % polyvinyl acetate | — | D1396-58+ | 0–2.5 | 0–2.5 | 0–2.5 | 0–2.5 | 0–2.5 | 0–1.0 | 0–2.5 |
| Butyral content expressed as % polyvinyl butyral, approx. | — | — | 80 | 80 | 80 | 88 | 88 | 80 | 80 |

TABLE 2

FORMVAR Polyvinyl Formal Resins

| Property | Units | ASTM Method | 12 85 | 5 95E | 6 95E | 7 95E | 15 95E |
|---|---|---|---|---|---|---|---|
| Physical | | | | | | | |
| Form | | | white, free-flowing powder | | | | |
| Volatiles, max. as packed | % | | 1.5 | 1.5 | 1.0 | 1.0 | 1.0 |
| Molecular wt. (weight average) | — | (1) | 26,000–34,000 | 10,000–15,000 | 14,000–17,000 | 16,000–20,000 | 24,000–40,000 |
| Solution viscosity 15% by wt. | cp. | (2) | 500–600 | 100–200 | 200–300 | 300–500 | 3,000–4,500 |
| Resin viscosity | cp. | (2) | 18–22 | 8–12 | 12–15 | 15–20 | 37–53 |
| Specific gravity 23°/23° (±0.002) | — | D792-50 | 1.219 | 1.227 | 1.227 | 1.227 | 1.227 |
| Burning rate | ipm | D635-56T | 0.5 | 0.8 | 0.9 | 0.9 | 1.0 |
| Refractive index (±0.0005) | — | D542-50 | 1.495 | 1.502 | 1.502 | 1.502 | 1.502 |
| Water absorption (24 hours) | % | D570-59aT | 1.0 | 1.2 | 1.2 | 1.2 | 1.2 |
| Hydroxyl content expressed as % polyvinyl alcohol | — | D1396-58+ | 5.5–7.0 | 5.0–6.5 | 5.0–6.5 | 5.0–6.5 | 5.0–6.0 |
| Acetate content expressed as % polyvinyl acetate | — | D1396-58+ | 22–30 | 9.5–13.0 | 9.5–13.0 | 9.5–13.0 | 9.5–13.0 |
| Formal content expressed as % polyvinyl formal, approx. | — | — | 68 | 82 | 82 | 82 | 82 |

(1) Molecular weight was determined by fractionating reacetylated samples of the PVOH's used for production of the various Butvar ® and Formvar ® resins. Distributions were based upon intrinsic viscosities of the various fractions, and weight-average molecular weight were caluclated from these distribution curves.

(2) Solution viscosity was determined in 15% by weight solutions in 60:40 toluene:ethanol at 25° C., using a Brookfield Viscometer. Also in 10% solution in 95% ethanol @ 25° C. using an Ostwald Viscometer. Resin viscosity - 5 g. resin made to 100 ml. with ethylene dichloride - measured at 20° C. using an Ostwald Viscometer.

B. Introduction of Carboxyl Groups-Steps #1.

In order to convert the forgoing water insoluble hydroxyl containing vinyl polymers into Hydrogels, they must be further modified. The first step in this modification of the starting material polymer involves the introduction of pendant free carboxyl groups into the polymer molecule. This is effected by reacting the hydroxyl groups, present in the vinyl alcohol groups of the polymer (B in Formula 1, above), with anhydride of a di- or polybasic carboxylic acid to form a half ester of the di- or polybasic acid with the vinyl alcohol units; as schematically illustrated in the following Equation 1:

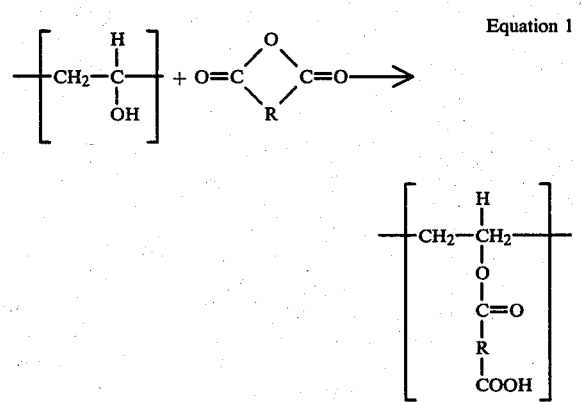

Equation 1

Suitable anhydrides include: maleic, succinic, azelaic polyanhydride, itaconic, glutaric, citraconic, trimellitic, benzophenone tetracarboxylic, and pyromellitic anhydrides; phthalic anhydride, 1.8 naphthalic anhydride, and the like can also be used, but quite hydrophobic and will not contribute as much hydrophilicity as the others mentioned above. Basically, the lower the equivalent weight (per carboxyl) of the anhydride, the more efficient and desirable it is for contributing hydrophilicity. Maleic anhydride (mol. wt. 98) equivalent weight is 49; trimellitic anhydride (mol. wt. 192) equivalent weight is 64, since, one of the principal reasons of reacting the hydroxyl containing polymer with an anhydride, is to improve the hydrophilicity of the final product; I prefer to employ highly polar anhydrides having an equivalent weight of from 40 to 100.

Definite ranges for the relative proportions of hydroxyl containing vinyl polymer and anhydride to be used can not be given since these proportions will vary with the particular hydroxyl containing vinyl) polymer used, the particular anhydride to be used, the presence of additional polar groups or oxygen in the anhydride used, the degree of hydrophilicity desired, the degree of crosslinking desired in the final product and, where added crosslinking agents are used on the particular crosslinking agents so used. Thus, the amount of anhydride employed may vary from that amount required to react with substantially all the hydroxyl groups in some particular hydroxyl containing vinyl polymers, down to such amount as is needed to react with only a minor portion of the free hydroxyl groups in many hydroxyl containing vinyl polymers. The higher the percentage of free -COOH groups introduced into the hydroxyl containing vinyl polymer the more hydrophilic the adduct will be. If the amount of polybasic acid added onto the polymer is too low, subsequent neutralization of the free -COOH groups can at best lead to a softened, cloudy or opaque polymer. Thus sufficient anhydride must be incorporated to yield a clear, transparent polymer when swelled in a dilute, aqueous alkali solution, at a pH about 7-11. On the other hand, if too high a percentage of —COOH groups are introduced into the polymer, as is possible if the hydroxyl containing vinyl polymer contains a high percentage of free hydroxyl groups, the adduct will swell to an excessively high water content and poor physical properties, or even be soluble in aqueous alkali in the form of its salt. The amount of anhydride, used in practising the present invention, must, therefore, be controlled so that the properties of the resulting adduct (half ester) fall between these limits for the particular hydroxyl containing vinyl polymer and the particular anhydride employed; i.e., the product has the desired degree of hydrophilicity but is water insoluble. The operative and preferred (optimum) relative proportions of hydroxyl containing vinyl polymer and anhydride, for specific reactants and specific final sparingly crosslinked Hydrogels, can be determined by preliminary test experiments.

The carboxylated adduct obtained in this step of my process is a half ester which, while hydrophilic, is not a Hydrogel; because it's not "sparingly crosslinked" and lacks the "low degree of crosslinking," which is characteristic of Hydrogels. The esterification of polybasic acids proceeds in steps, at different reaction rates and temperatures. The first carboxyl is the strongest; consequently, it will esterify most rapidly, and at a lower temperature than the second carboxyl. Acid anhydrides of polybasic acids add onto alcoholic hydroxyls to form a half ester at a much lower temperature than that needed for the subsequent esterification of the liberated second carboxyl.

The reaction between the hydroxyl containing vinyl polymer and the anhydride, to form the hydrophilic, half ester, carboxylated adduct, can be carried out in the manner known in the art. Conveniently the reaction can be carried out in a liquid inert solvent medium in which the hydroxyl containing vinyl polymer and anhydride are soluble or dispersible. The reaction between the anhydride groups and the hydroxyl groups of the polymer backbone can be accelerated considerably by incorporation of a suitable catalyst. Small amounts, e.g., 1% or less, of a strong acid such as sulfuric, toluene sulfonic, methanesulfonic acid, etc., or an organo tin compound, such as Butyl stannoic acid, stannous oxalate, dibutyl tin oxide, etc., or of tetraalkyl titanates or other organic titanates, are very effective. Suitable specific process for the preparation of the carboxylated adduct are described in detail in the accompanying Specific Examples.

c. Crosslinking to form Hydrogel—Step #2.

In order to form a Hydrogel, the carboxylated adduct (half ester) must now be crosslinked. Several methods are possible.

i. Internal Crosslinking

Since anhydride additions or esterifications are almost never quantitative, some free —OH groups usually remain in the carboxylated polymer produced in Step 1; similarly, if the stoichiometric amount of —COOH is smaller than the number of available —OH, the carboxylated polymer adduct will contain —OH as well as —COOH groups. By heating the carboxylated polymer to a higher temperature under anhydrous conditions, such as during molding, some of the second (free) carboxyls will esterify with free —OH groups and thereby crosslink the polymer; which thus becomes insoluble in solvents, and will only swell but no longer dissolve in aqueous alkali. It has now become a Hydrogel, or more strictly speaking in its anhydrous form, in which it is initially formed, a "Xerogel".

ii. Controlled Crosslinking by Chemicals

The carboxylated polymer can also be crosslinked by reacting free —COOH groups thereof with various polyfunctional reactants ("crosslinking" agents). These include:

Butanediol 1,4-diglycidyl ether,
Low molecular weight (under 1200) liquid or solid epoxy resins,
Triglycidyl isocyanurate (Ciba PT-810),
Hexamethylol melamine methyl ether (Cymel, American Cyanamid),
Urea-Formaldhyde, Melamine-Formaldehyde, Hydantoin-Formaldehyde resins, phenolic resins, benzotriazole resins.
Polyglycols, glycerol, polyhydric alcohols.
Polyamines, including Polypropylene oxide amines (Jeffamines, Texaco Corp.)
Polyaziridines, including XAMA, a tri-aziridine (Cordova Chemical Co.).

As indicated previously, the crosslinking may be effected by molding, under heat and pressure, the carboxylated polymers which still contain sufficient free hydroxyl groups for the desired degree of crosslinking (internal crosslinking); or an intimate mixture of the carboxylated polymer with such amount of the chemical crosslinking agents needed for the desired degree of crosslinking. Intimate mixtures of the carboxylated adduct and the crosslinking agents may be obtained conveniently by adding and dissolving the desired amount of the crosslinking agent to a solution of the carboxylated adduct in an inert solvent (such as the solution of carboxylated adduct obtained when the carboxylation step is carried out in an inert solvent). The solvent may then be removed by drying the thus formed solutions in trays, etc. to form sheets which may then be simultaneously molded and crosslinked. For the production of Softlenses such molding is advantageously carried out in molds ground and polished to optical shapes and smoothness such that the final crosslinked product is obtained directly as optical lens shaped Xerogel, which when immersed in aqueous alkali absorbs water to become a Hydrogel. Other shaped molds may be used for other applications, and in fact for the production of Softlenses the molding may be carried in rod shaped moulds (the thus obtained rods being then cut into discs) or in disc shaped moulds; and the thus obtained discs being then ground and polished, while still in Xerogel form, to the desired optical shape and specifications. Such a practice, however, would needlessly add to the expense of producing the final Softlenses; except perhaps for special shapes whose mass production by simultaneous crosslinking and molding might not be justified. Also, for many applications, the crosslinking may be effected under anhydrous conditions in solution or dispersion of the carboxylated polymer, admixed if needed with crosslinking agent, in inert solvents from which the crosslinked Xerogel precipitates.

The crosslinking reaction should of course by conducted at temperatures below that at which the color of the resulting Xerogel, and ultimate Hydrogel, may be adversely affected, i.e., below about 200° C. The degree of crosslinking to be effected will of course vary with the particular carboxylated vinyl polymer employed and the degree of hydrophilicity desired in the ultimate Hydrogel, but usually is in the range of 1 crosslink per 30 or more monomer molecules present in the polymer chain. The crosslinked Xerogel should swell at least 50% when immersed in a highly polar solvent, such as methyl- or ethylacetate, methyl ethyl ketone, dioxane, etc., without dissolving. If it dissolves, this indicates insufficient crosslinking or cure.

The details of the present invention will be apparent from a consideration of the Specific Examples thereof which follow and which are illustrative of preferred embodiments of the invention. Unless otherwise specified, the parts are by weight.

EXAMPLE I 100 parts Polyvinyl Butyral (Butvar B-79, Monsanto),
40 parts Maleic Anhydride,
0.05 parts Butyl stannoic acid (Fascat 4100, M&T Chemicals, Inc.),
are mixed intimately in a ball mill. The blend is then compounded on a heated two-roll rubber mill at about 120° C. until clear. The resulting sheet is allowed to cool on a flat surface, cut to size, and transferred to a matched metal mold with multiple cavities for the desired lens shapes, and molded, e.g., for 20 minutes at 180° C., and 1000 p.s.i. pressure. The clear, transparent lenses were swelled in an excess of 1% aqueous $NaHCO_3$ solution, then washed repeatedly with distilled water. The clear Hydrogel lenses thus obtained were very flexible, tough, resilient, showed good elongation and elasticity, and had a water content of 57%.

EXAMPLE II 100 parts Butvar B-79
25 parts Maleic Anhydride
4 parts Triglycidyl isocyanurate (PT-810, Ciba),
0.05 parts Fascat 4100,
were processed as in example I. The resulting Hydrogel lenses were tough, flexible, clear, scratch resistant, and had a water content of 50.7%.

EXAMPLE III 100 parts Butvar B-79,
48 parts Trimellitic Anhydride,
0.05 parts Fascat 4100,
were dissolved in 500 parts Methyl ethyl ketone, and the solution heated under pressure in an autoclave with agitation to 130° C. for 4 hours. After cooling to room temperature, the clear solution was poured into a flat Tefon lined pan to a depth of about 6 mm., and the solvent allowed to evaporate at room temperature, during about 24 hours. The polymer was then force-dried in an oven at 50° C. for about two hours. Drying was continued in a vacuum oven at 50° C. for an additional 2 hours under about 28-29" vacuum. The tough, clear, colorless film was removed from the pan, and lenses molded therefrom, as in example I.

After swelling in dilute aqueous alkali solution, and repeated washing in distilled water, the Hydrogel lenses obtained were colorless, clear, tough, flexible, resilient, and possessed a 68.53% water content.

EXAMPLE IV 100 parts Butvar B-73,
24 parts Maleic Anhydride,
15.7 parts Trimellitic Anhydride,
0.05 parts Fascat 4100,
were dissolved in 400 parts Dioxane, and the solution refluxed for 12 hours. The clear resin solution was then poured into shallow Teflon lined pans (trays) to a depth of 5–10 mm., depending on the ultimate thickness of the desired dried film. The Dioxane was allowed to evaporate, at room temperature, followed by drying in a vacuum oven, first by gradual raising of the temperature from 50° to 90° C., and then gradually applying increasing vacuum to about 28". The solvent-free, clear, transparent, tough polymer sheet was removed from the tray. Lenses were obtained by molding in a matched metal mold for 15 minutes at 180° C. and about 1000 p.s.i. After swelling in an excess of 1% $NaHCO_3$ solution, and washing in distilled water, the clear Hydrogel lenses obtained were tough, soft, flexible, and elastic, and possessed a water content of about 55%, 45% polymer.

EXAMPLE V

A solution of:
100 parts Butvar B-98,
40 parts Succinic Anhydride,
20 parts Maleic Anhydride,
0.05 parts Butyl stannoic acid,
1440 parts Dioxane,
was refluxed with agitation for 18 hours. A clear, slightly bodied solution was obtained.

EXAMPLE VI

To 400 parts of the polymer solution of Example V, there was added 0.8 parts Butanediol diglycidyl ether and the resulting solution vacuum spray dried at 80° C. A colorless, non-tacky powder was obtained, which could be molded by injection or compression molding techniques at 130°–140° C. to form lenses.

After swelling in dilute aqueous alkali, at pH 8.5 to 9.5, the swelled hydrogel lenses, after repeated washing in distilled water, showed a water content of 50.2% and were flexible, tough, clear, and tear resistant.

EXAMPLE VII

To 400 parts of the polymer solution of Example V, there was added:
2 parts Polyethylene Glycol 600,
5 parts Hexametoxymethyl Melamine (Cymel 303),
0.03 parts Toluenesulfonic acid,
and the resulting clear solution vacuum spray dried at 100° C. The resulting powder could be compression molded at 160° C. and 300° to 700 P.S.I. for 10 minutes to form lenses. After swelling in dilute alkali, followed by repeated washing in distilled water, the Hydrogel Softlenses obtained had a water content of 48.3%, and possessed excellent physical properties and clarity.

EXAMPLE VIII

To 400 parts of the polymer solution of Example V, there was added:
8 parts XAMA-7 (an approximately 3.3 functional liquid polyaziridine, Molecular Weight about 475, mfd. by Cordova Chemical Company).

The clear solution was first allowed to air dry at room temperature, in a shallow Teflon lined tray, to form a sheet about 2 mm. thick. The tray was then transferred to a circulating air oven, and drying continued at 40° C. It was then transfered to a vacuum oven, and the solvent removal was completed at 50° C., under gradually increasing vacuum, until finally 29″ of vacuum were obtained.

The solvent-free sheet was removed from the tray, cut to size, and placed in a matched metal mold with multiple cavities corresponding to the desired lens shapes. After molding at 140° C. and 1000 p.s.i. for five minutes, the clear lenses were removed from the mold. After swelling in a 1% aqueous $NaHCO_3$ solution for 48 hours, followed by repeated washing in distilled water, the resulting Hydrogel lenses were flexible, soft, elastic, tough, and resilient, and had a water content of 52.6%.

EXAMPLE IX

To 100 parts of Bakelite Vinyl Alcohol-Vinyl Acetate Resin Solution Ma-28-18 (a copolymer of 72% Polyvinyl Acetate and 18% Polyvinyl Alcohol, 28% Non-Volatiles in Methyl Acetate), there was added
   3.8 parts Maleic Anhydride,
   0.1 part Butyl stannoic acid.
The solution was poured into shallow trays, and the solvent removed as in Example II. Lenses molded from the sheet obtained were molded in a matched metal mold at 180° C. and 1000 p.s.i. for about 15 minutes. The resulting lenses, after swelling in alkali and washing as in Example VIII, were clear, flexible, soft, and had a water content of 86%.

EXAMPLE X

Example IX was repeated but the 3.8 parts of Maleic Anhydride were replaced by:
   16 parts Trimellitic Anhydride.
The final lenses, molded for 30 minutes at 200° C. and 1000 p.s.i. were swelled as in example IX and resulted in soft, flexible Hydrogel lenses with excellent clarity and physical properties, and a water content of 76%.

EXAMPLE XI 179 parts of Bakelite MA-28-18 solution of Example IX were compounded with
   50 parts Butvar B098,
   60 parts Maleic Anhydride,
   0.032 parts Butyl stannoic acid in a vacuum,
Banbury mixer at 40°–50° C. and atmospheric pressure until a homogeneous solution was obtained. The temperature was then raised gradually to about 100° C., while gradually applying vacuum to remove all solvent. The viscous resin was spread while still hot onto a flat surface, in a 2-3 mm. layer, and allowed to cool to room temperature. It was then pulverized in an impact mill to produce a molding powder.

Lenses molded from this powder by compression molding at 170° C. and 500 p.s.i. were swelled in dilute alkali, followed by repeated washing, as in example IX. The Hydrogel lenses obtained were clear, very tough, tear resistant, flexible, and elastic, and had a water content of 63.7%.

It will be understood, of course, that the carboxylated adducts of polybasic anhydrides and hydroxyl containing vinyl polymers can be internally plasticized by partial reaction thereof with internal plasticizing agents, such as those named below, by:

(a). Partial esterification with a Polyglycol, glycol ether or polyglycol ether. Commercially available products of this type include the CARBOWAX Polyethylene Glycols Nos.: 200,300,400,540, 600, 1000, 1540, 4000, 6000, and 14000, available from Union Carbide Corp. (the numbers indicate the approximate average molecular weight of the various polyethylene glycols)

CARBOWAX Methoxy Polyethylene Glycols Nos: 350, 550, 750, 2000 & 5000 available from Union Carbide Corp. (the numbers indicate the approximate average mol. wt. of the individual products).

Analogous products to the above are also available from Wyandotte Chemical Co., Wyandotte, Mich.

Ethoxy Polyethylene Glycols, analogous to the Methoxy Polyethylene Glycols named above are also commercially available from both Wyandotte and Carbide.

Glycol ethers commercially available are exemplified by Methyl CELLOSOLVE, CELLOSOLVE, Butyl CELLOSOLVE, and Hexyl CELLOSOLVE (the mono methyl-, ethyl-, butyl- and and hexyl- ethers of ethylene glycol, respectively) available from Union Carbide Corp; as are corresponding mono ethers of diethylene glycol as Methyl CARBITOL, CARBITOL, Butyl CARBITOL and Hexyl CARBITOL.

also

Ethylene Oxide adducts of polyhydric alcohols such as glycerol and pentaerythritol are available in a number of grades from Union Carbide Corp., under the Trade-mark NIAX polyether polyols; similare products are also available from Wyandotte Chemical Co.

(b) Reaction with Polyamines; including JEFFAMINES, available from Texaco, Corp. These are aliphatic polyether primary di- and tri- functional amines derived from propylene oxide adducts of diols and triols.

JEFFAMINE D-230, D-400 and D-2000 are represented by the structure:

    Formula 2 x = (approx.)  2.6 JEFFAMINE 230
               5.6 JEFFAMINE 400
              33.1 JEFFAMINE 2000

JEFFAMINE T-403 has the following structure:

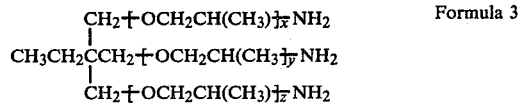    Formula 3

X + y + z = (approx.) 5.3

(c) reaction with Olefin monoepoxides, $C_4$-$C_{12}$.

The purpose of such internal plasticization, when used, is reduce melting point, increase flow and facilitate molding. The highly polar and hydrophilic modifiers also improve the rate of swelling and water absorption of the final Hydrogel.

I claim:

1. A method of preparing a stable, three dimensional Xerogel, which when immersed in dilute aqueous alkali at a pH of 7-11 absorbs water to form a water insoluble Hydrogel, which comprises: (I) introducing pendant carboxyl groups into (a) a water insoluble, linear vinyl polymer containing free hydroxyl groups and selected from the group consisting of vinyl alcohol-vinyl acetate copolymers composed, by weight, of from about 92.5% to about 53% vinyl acetate groups and from about 7.5% to about 47% vinyl alcohol groups and polyvinyl acetals, by heating a mixture of a major amount of said polymer and (b) a predetermined minor amount of an anhydride of a polybasic carboxylic acid to produce a carboxylated adduct of said polymer by reaction of free hydroxyl groups on said polymer with said anhydride to form monoesters of said polybasic acid with said polymer containing free pendant carboxyl groups; and (II) thereafter sparingly crosslinking to a predetermined amount the thus obtained carboxylated adduct under anhydrous conditions by heating (c) said carboxylated adduct to a temperature and for a time to effect reaction between free hydroxyl groups and pendant carboxyl groups on said adduct to form ester groups, or (d) adding to and intimately admixing with said carboxylated adduct a predetermined minor amount of polyfunctional crosslinking agent, the functional groups of which are reactive with the hydroxyl or carboxyl groups of said adduct, and heating such mixture to a temperature and for a time to effect reaction between the functional groups on said crosslinking agent and said hydroxyl or carboxyl groups on said carboxylated adduct; the amount of said anhydride employed in said carboxylation step, the amount of crosslinking effected and amount of crosslinking agent employed in said crosslinking step being such amounts as are predetermined as needed to produce a Xerogel which when immersed in dilute aqueous alkali at a pH of 7-11 absorbs water and swells to form a water insoluble Hydrogel having a water content of about 48% to about 86%.

2. A process as defined in claim 1, wherein the carboxylation Step I is carried out in an inert organic solvent and the thus obtained carboxylated adduct is recovered by drying.

3. A process as defined in claim 1, wherein the carboxylation step I is carried out in the presence of a catalyst therefor.

4. A process as defined in claim 3, wherein the carboxylation step I is carried out in an inert organic solvent and the thus obtained carboxylated adduct is recovered by drying.

5. A process as defined in claims 1, 2, 3 or 4, wherein the crosslinking step II is carried out by molding the carboxylated adduct under heat and pressure in a mold.

6. A process as defined in claim 1, 2, 3, or 4, wherein the crosslinking step II is carried out by molding the carboxylated adduct formed in step I, under heat and pressure, in a matched mold having multiple cavities therein for optically shaped contact lenses, whereby the Xerogel is obtained in the form of a plurality of optically shaped contact lenses.

7. A process as defined in claim 1, 2, 3 or 4, wherein the water insoluble vinyl polymer containing free hydroxyl groups employed in the carboxylation step I is a polyvinyl acetal resin selected from the group consisting of polyvinyl butyral and polyvinyl formal resins.

8. A process as defined in claim 1, 2, 3 or 4, wherein the water insoluble vinyl polymer containing free hydroxyl groups employed in the carboxylation step I is a vinyl alcohol-vinyl acetate copolymer composed, by weight, of from about 92.5% to about 53% vinyl acetate groups and from about 7.5% to about 47% vinyl alcohol groups and wherein the crosslinking step II is carried out by molding, under heat and pressure, the carboxylated adduct formed in Step I in a matched mold having multiple cavities therein for optically shaped contact lenses, whereby the Xerogel is obtained in the form of a plurality of optically shaped contact lenses.

9. A stable, three dimensional Xerogel produced by the process defined in claims 1, 2, 3 or 4 and which, when immersed in dilute aqueous alkali at a pH of 7-11, absorbs water to form a water insoluble Hydrogel.

10. An optically shaped water insoluble, Hydrogel soft contact lens produced by immersing in dilute aqueous alkali at a pH of 7-11 an optically shaped Xerogel produced by the process defined in claim 1, 2, 3 or 4 wherein the crosslinking step II of said claim is carried out by molding, under heat and pressure, the carboxylated adduct, formed in step I of said claims, in a matched mold having multiple cavities therein for optically shaped contact lenses.

11. A process as defined in claim 1, 2, 3 or 4, wherein the water insoluble vinyl polymer containing free hydroxyl groups employed in the carboxylation step I is a polyvinyl acetal resin.

12. An optically shaped water insoluble, Hydrogel soft contact lens produced by immersing in dilute aqueous alkali at a pH of 7-11 an optically shaped Xerogel produced by the process defined in claim 1, 2, 3, or 4 wherein the crosslinking step II of said claim is carried out by molding, under heat and pressure, the carboxylated adduct, formed in step I of said claim, in a matched mold having at least one cavity therein for an optically shaped contact lens.

* * * * *